Sept. 2, 1958 G. ALDERTON ET AL 2,850,427
ATERRIMINS AND THEIR PREPARATION
Filed April 17, 1956 3 Sheets-Sheet 1
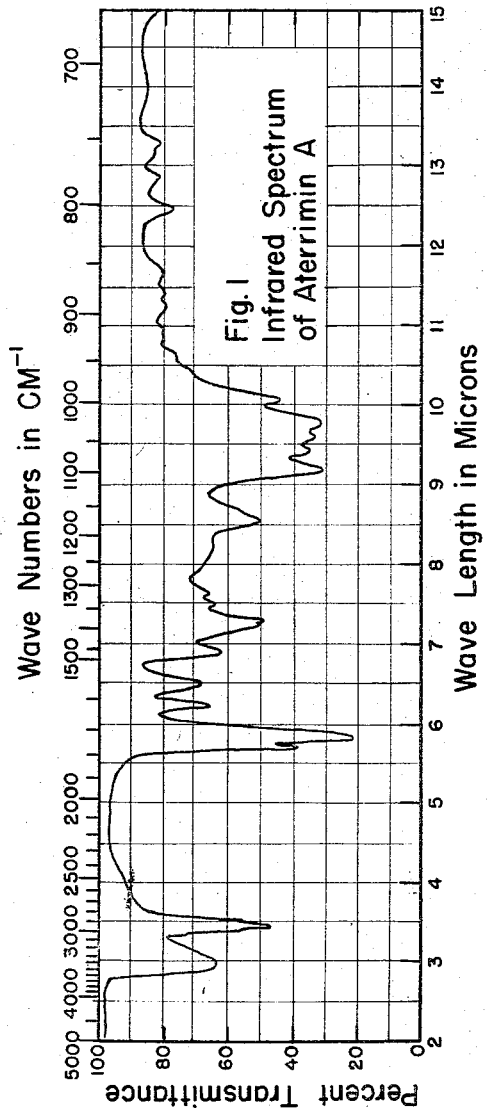
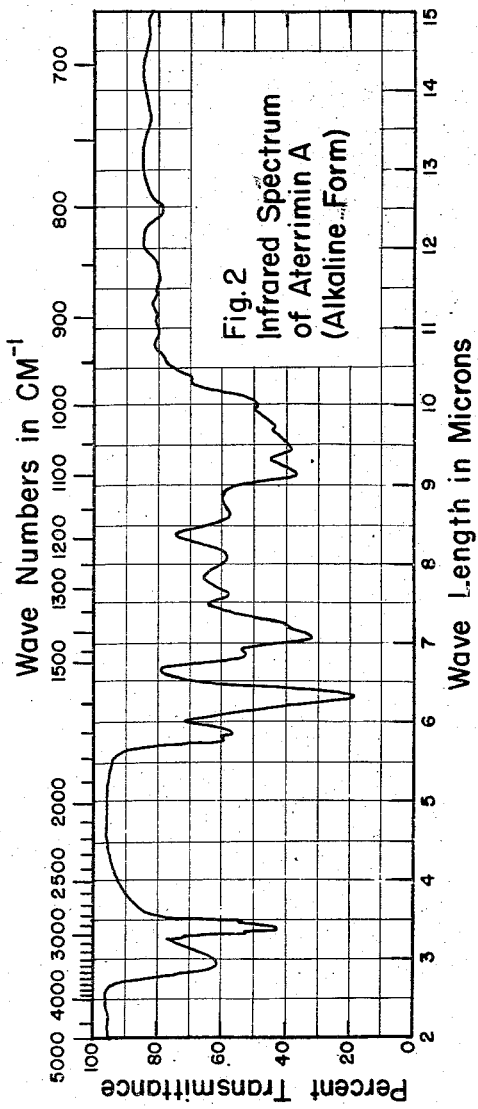
Gordon Alderton
Neva S. Snell
INVENTORS
BY

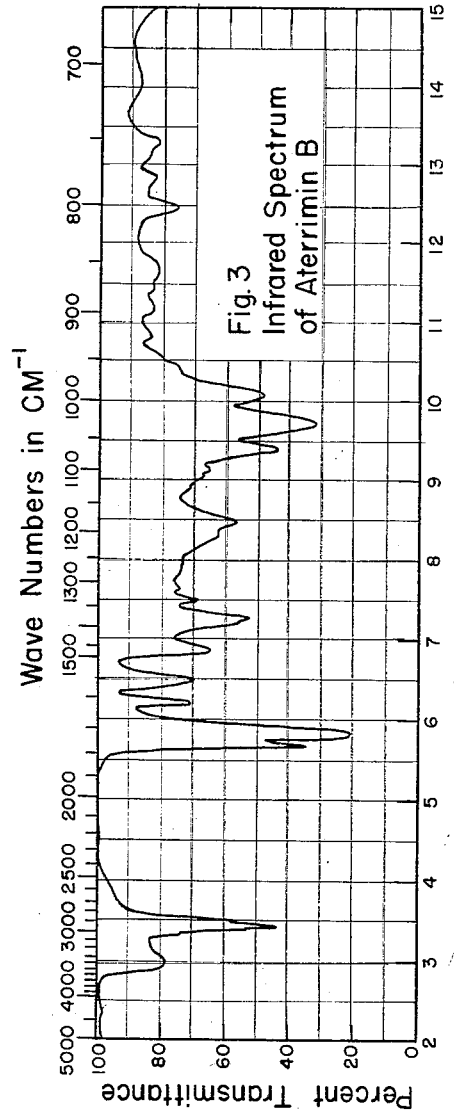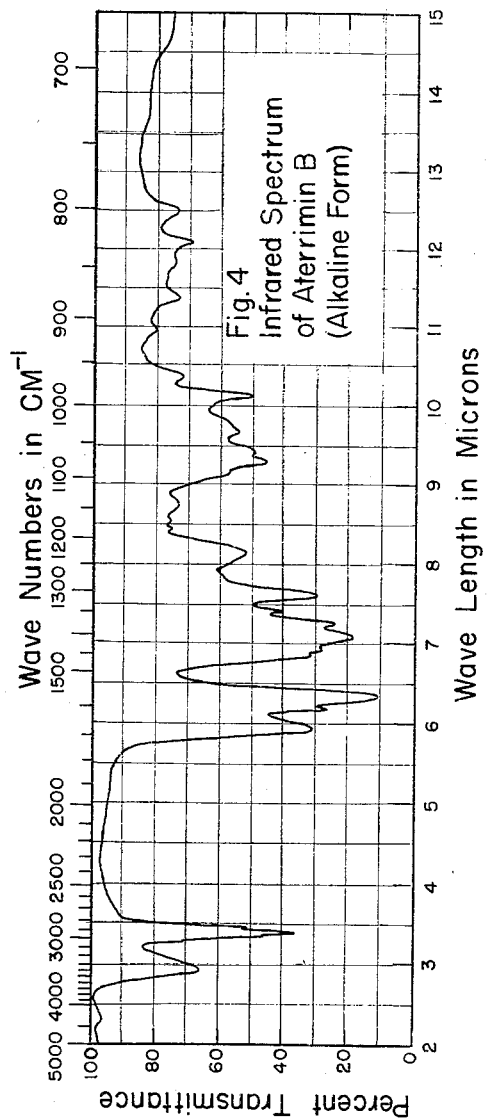

Sept. 2, 1958     G. ALDERTON ET AL     2,850,427
ATERRIMINS AND THEIR PREPARATION
Filed April 17, 1956     3 Sheets-Sheet 3
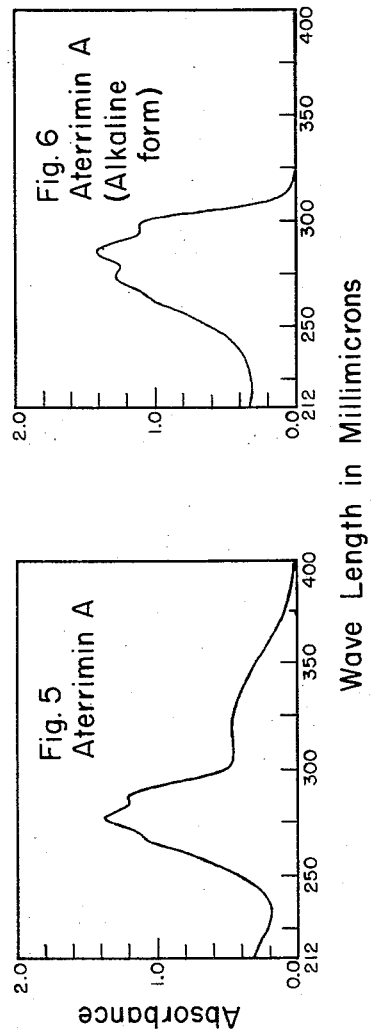
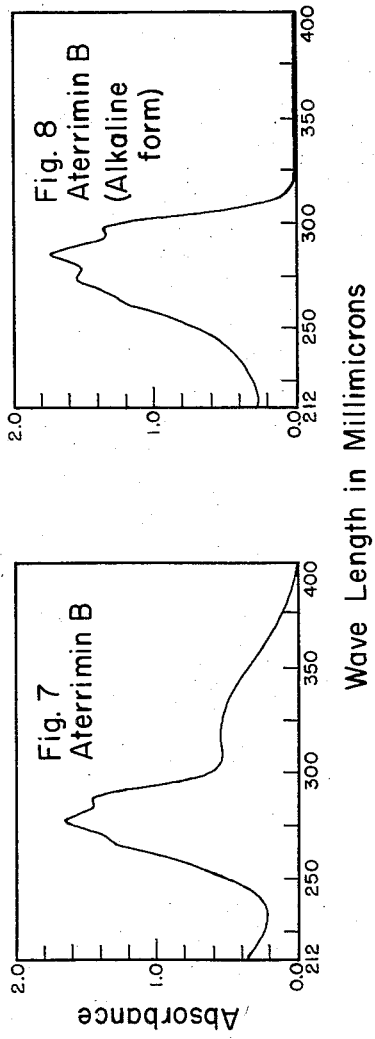
Gordon Alderton
Neva S. Snell
        INVENTORS
BY

2,850,427

ATERRIMINS AND THEIR PREPARATION

Gordon Alderton, Richmond, and Neva S. Snell, Berkeley, Calif., assignors to the United States of America as represented by the Secretary of Agriculture Application April 17, 1956, Serial No. 578,852

9 Claims. (Cl. 167—65)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of our copending application Serial No. 423,865, filed April 16, 1954 now abandoned.

This invention concerns new and useful improvements in biochemical substances and particularly concerns new substances, herein termed aterrimins, which posses antibiotic activity (in vitro) and which have growth-stimulating properties for animals. The objects of the invention include the provision of the new compounds as well as methods for preparing them. Further objects and advantages of the invention will be obvious from the description herein.

It has been found that aterrimins are produced by culturing a particular and hitherto unknown strain of *Bacillus subtilis* on a liquid nutrient medium under aerated, agitated submerged culture. A culture of the organism in question has been deposited in the Stock Culture Collection of the Northern Regional Research Laboratory, U. S. Department of Agriculture, Peoria, Illinois, as *Bacillus subtilis* var. *aterrimus* NRRL B–1471. The general taxonomic properties of this strain are in accord with the characteristics of the *B. subtilis* species set forth by Smith, Gordon, and Clark in Monograph No. 16 of the U. S. Department of Agriculture, November 1952, entitled "Aerobic Sporeforming Bacteria," page 73, line 6, to page 74, line 21. Although the general taxonomic characteristics of the strain which we use conform to those of all strains of *B. subtilis*, the strain we use differs markedly from the known strains in several important respects, as follows: (1) The NRRL B–1471 strain has the ability to elaborate aterrimins; scores of other strains have been found to be incapable of producing these substances. (2) The NRRL B–1471 strain has the ability to grow rapidly and efficiently under artificial culture conditions, that is, in aerobic, submerged culture in simple nutrient-containing liquid medium. It has been found for example that this strain grown under such conditions produces yields of bacterial cells in the range 19 to 40%. This percentage yield refers to the dry weight of the bacterial cells in proportion to the weight of the sugar supplied as the carbohydrate nutrient. These yields are surprisingly high and unobtainable with many other strains of this species. (3) Although the NRRL B–1471 strain eleaborates antibiotic factors, namely, aterrimins, it does not elaborate subtilin, bacitracin, or any of the other antibiotics which have been shown to be elaborated by antibiotic-producing members of the genus Bacillus. In this regard reference is made to Snell, Ijichi, and Lewis, Applied Microbiology, vol. 4, No. 1, pp. 13 to 17, January 1956.

The strain NRRL B–1471, because it produced a blue-black pigment on media containing readily utilized carbohydrates, was classified as *B. subtilis* var. *aterrimus*. However this variety readily loses the property of pigment production and inasmuch as there is no reason to assume that pigment production is correlated with the production of the aterrimins, this invention encompasses the use of this particular strain whether it is in a pigmented phase or a non-pigmented phase.

By application of separation procedures to the above-described cultures, one is enabled to obtain an aterrimin concentrate, or complex as it may be called. This complex has been found to consist primarily of two different compounds which are termed aterrimin A and aterrimin B, these compounds being related to one another chemically as well as biologically. Aterrimins A and B may be isolated in pure form from the aterrimin concentrate. The properties of these new compounds are set forth below:

The aterrimins are soluble in methyl, ethyl, propyl, isopropyl, and butyl alcohols, ethyl ether, and acetone but are relatively insoluble in carbon tetrachloride, saturated hydrocarbons, and other relatively non-polar organic solvents. In water, they are soluble at alkaline pH's whereas they are relatively insoluble at neutral or acid pH's. They contain the elements carbon, hydrogen, and oxygen. For aterrimin A, chemical analysis gave carbon 65.5%, hydrogen 7.8%, and oxygen 26.7% (by difference). For aterrimin B, chemical analysis gave carbon 69.7%, hydrogen 8.05%, and oxygen 22.25% (by difference). The specific rotation of aterrimin A in absolute ethanol is $[\alpha]_{25}^D = +245°$. The specific rotation of aterrimin B in absolute ethanol is $[\alpha]_{25}^D = +342°$. Determinations of saponification equivalents indicated a value of 248 g./eq. for aterrimin A and 355 g./eq. for aterrimin B. These values were obtained by treating an alcohol solution of each compound with an excess of alkali at room temperature, then adding an equivalent amount of hydrochloric acid and titrating with standard alkali to a phenolphthalein end point.

The aterrimins have also been characterized by their partition coefficients in several 2-phase solvent systems. The values of the partition coefficients shown in the following table were obtained from countercurrent distributions in the Craig apparatus.

TABLE 1.—PARTITION COEFFICIENTS OF ATERRIMINS A AND B

| System designation | Two-phase solvent system (figures refer to parts by volume) | Partition coefficient (22–23° C.) Aterrimin A | Partition coefficient (22–23° C.) Aterrimin B |
|---|---|---|---|
| F | Ethyl acetate, 3; carbon tetrachloride, 3; "Skellysolve B",[1] 3; methyl alcohol, 4; water, 4. | 1.06 | 0.40 |
| G | Ethyl acetate, 1; carbon tetrachloride, 1; "Skellysolve B", 1; methyl alcohol, 1: water, 1. | 0.74 | 0.28 |
| H | Carbon tetrachloride, 2; "Skellysolve B", 2; isopropyl alcohol, 2; water, 2. | 0.80 | 0.14 |
| O | Chloroform, 1; carbon tetrachloride, 1; methyl alcohol, 3; water, 1. | 1.7 | 1.0 |

[1] "Skellysolve B" is a petroleum distillate containing mostly hexane and having a boiling range of 63.3 to 70° C.

The isolated aterrimins A and B are light yellow powders or glasses in the solid state; they are not crystalline and have no definite melting points. They are sensitive to daylight in both the solid state and as solutions in organic solvents. In the latter case (solutions) the light sensitivity varies inversely with solvent polarity and directly with temperature. For example, solutions of a few micrograms per ml. in ethyl alcohol are stable for many hours in strong daylight at room temperature but only for a few minutes at the reflux temperature. On the other hand, in relatively non-polar solvents such as carbon tetrachloride, or as a thin film in the solid state, daylight at room temperature destroys most of the biological activity in a few hours. The light sensitivity becomes evident only after extensive purification has removed colored impurities which are normally associated with the aterrimins in the culture solids and which exert a protective effect by screening out the harmful wavelengths.

*Infrared absorption spectra*

Characteristic infra-red absorption spectra were taken on samples of aterrimins A and B and their sodium salts in potassium bromide pellets. These spectra are illustrated in Figs. 1 to 4 wherein Fig. 1 is the spectrum of aterrimin A; Fig. 2 is the spectrum of aterrimin A in the alkaline (sodium salt) form; Fig. 3 is the spectrum of aterrimin B; and Fig. 4 is the spectrum of aterrimin B in the alkaline (sodium salt) form. The absorption bands of these four compounds are listed in the following table:

TABLE 2.—INFRA-RED ABSORPTION BANDS OF ATERRIMINS

| Aterrimin A, microns | Aterrimin A sodium salt, microns | Aterrimin B, microns | Aterrimin B sodium salt, microns |
|---|---|---|---|
| 2.94 | 2.99 | 2.94 | 2.96 |
| 3.43 | 3.43 | 3.43 | 3.42 |
| 5.69 | 5.81 | 5.68 | 5.95 |
| 5.81 | 5.90 | 5.84 | 6.19 |
| 6.19 | 6.36 | 6.20 | 6.35 |
| 6.48 | 6.90 | 6.50 | 7.09 |
| 6.88 | 7.11 | 6.88 | 7.27 |
| 7.27 | 7.66 | 7.28 | 7.41 |
| 7.49 | 8.10 | 7.48 | 7.52 |
| 7.63 | 8.66 | 8.48 | 8.15 |
| 8.54 | 9.16 | 9.14 | 8.75 |
| 9.18 | 9.48 | 9.41 | 9.30 |
| 9.42 | 9.75 | 9.74 | 9.44 |
| 9.59 | 10.03 | 10.09 | 9.66 |
| 9.75 | 10.35 | 10.83 | 10.12 |
| 10.04 | 12.47 | 11.19 | 10.37 |
| 12.46 | ----- | 11.68 | 10.96 |
| 12.86 | ----- | 12.47 | 11.37 |
| 13.30 | ----- | 12.85 | 12.09 |
| ----- | ----- | 13.29 | 12.49 |

*Ultraviolet absorption spectra*

*Aterrimin A.*—In absolute alcohol the U. V. spectrum of aterrimin A shows a maximum at 277 mu with an absorption coefficient of 63 liters/g. cm., a maximum at 287 mu, a broad maximum at 310–325 mu, a shoulder at 267 mu, and a broad minimum at 225–240 mu, as shown in Fig. 5. The alkaline (sodium salt) form shown in Fig. 6 is the spectrum of 65.7 micrograms of aterrimin A plus 5 micro liters of 0.508 N NaOH plus 3 ml. of absolute alcohol. The alkaline spectra shows a maximum at 286 mu with an absorption coefficient of 65.3 liters/g. cm., a maximum at 297 mu and at 273 mu, a faint shoulder at 263 mu.

*Aterrimin B.*—Aterrimin B in absolute alcohol has a maximum at 277 mu with an absorption coefficient of 80 liters/g. cm. Like aterrimin A other maxima occur at 287 and 310–325 mu, a shoulder at 267 mu, and a broad minimum around 230 mu as shown in Fig. 7. The alkaline (sodium salt) form in Fig. 8 is the spectrum of a solution of 20.8 micrograms/ml. of aterrimin B plus 5 microliters/ml. of 0.101 N NaOH. It shows maxima at 286 mu, 274 mu, and 298 mu, and a faint shoulder at 262–3 mu.

*Chemical structure*

Experimentation indicates that the native aterrimins (as they exist in the cultures) are lactones. On treatment with an alkaline substance, the lactone ring is broken, producing a salt of the aterrimin. If the salt is acidified there is produced the hydroxy-acid form of the aterrimin. This acid form slowly reverts to a lactone form. Both aterrimins A and B thus exist in the original lactone form or may be treated with alkaline agents to produce salts. The products obtained by treatment with an alkaline agent are herein termed "alkaline" or "salt" forms. The salt may in turn be acidified to get the hydroxy acid form which will in time revert to a lactone form.

The experimental data in regard to these changes are explained below:

The ultraviolet spectral behavior of the aterrimins on treatment with alkali followed by acid is similar to that of lactones. For example, when alkali is added to an alcohol solution of aterrimin A with a spectrum like that of Fig. 5 the spectrum changes to that shown in Fig. 6. On reacidification of the alkaline solution a third species immediately appears with a characteristic spectrum which is different from either that of the untreated or alkaline form. Spectrophotometric measurement of the ionization constant of this third species gives a value characteristic of the carboxyl group. On standing in acid the spectrum of the third species slowly reverts toward that of the original untreated aterrimin. The "half life" of the reversion toward the original spectrum is about 6 hrs. in 0.05 N acid and thus sufficiently slow to allow spectrophotometric measurements of the ionization constant of the third species. The reversion toward the original spectrum is interpreted as relactonization of the free hydroxy acid (3rd species). The infrared spectra of the original and alkali treated aterrimins shown in Figs. 1 to 4 are also consistent with a lactone structure. The antibiotic activity of the alkaline form of the aterrimins when measured by a cup plate method against *B. megaterium* is only about 15% of that of untreated compounds. Acidification of the alkaline form partially restores the specific antibiotic activity to a value about 50% of that of the native aterrimin.

With regard to their biological activity, the aterrimins have an antibiotic spectrum (in vitro) similar to that of penicillin, subtilin, and gramicidin, although they are totally different from these substances from a chemical standpoint. The aterrimins are very effective in their in vitro activity against the gram-positive bacteria, for example staphylococci, streptococci, pneumococci, bacilli, etc. Neither the in vivo activity nor the toxicology of the aterrimins have been completely investigated and it is not represented that they would have any utility as human therapeutic agents.

The preparations containing the aterrimins produced in accordance with this invention are particularly useful because they exhibit growth-promoting activity with regard to chicks. That is, if a minor amount of the aterrimins are added to a basal diet which already contains all the known essential growth factors, the birds will grow faster on such diet than they will on the basal diet. In addition with the aterrimin-supplemented diet, the gain per unit weight of food is higher than when they are fed the basal diet. In this regard, aterrimin concentrates exhibit activity at dosages at least as low as those that are generally used for penicillin, chlorotetracycline, oxytetracycline, and bacitracin. Thus the aterrimin preparations and particularly the aterrimin concentrates are useful as supplements for animal feeds to provide a ration which will stimulate growth of the animal feeding thereon. The benefits derived from such supplemented feed are that the animal gains weight more rapidly and requires less feed per unit of gain. In the supplementation of animal feeds one may use either aterrimin A or aterrimin B but usually it is more convenient and economical to use the complex containing both of these individual substances. As explained below this aterrimin complex may readily be isolated from the culture of the aterrimus organism.

The products of this invention, that is, the aterrimin concentrates, aterrimin A, aterrimin B, or their salts or acid forms, may be employed as agents to prevent gram-positive microbial activity in various substrates. For example, the products of the invention may be added to fermentation mashes to prevent contamination by gram-positive organisms.

As noted briefly above, the aterrimins are produced by culturing the B-1471 strain under aerated agitated submerged conditions. Such culturing involves essentially preparation of a liquid nutrient medium, inoculating the medium with a culture of the organism and then conducting the growth in a conventional apparatus useful for conducting agitated aerated submerged fermentations. A suitable fermentor includes a vessel for holding the inoculated medium, an agitating device and means for forcing air into the culture for maintaining aerobic conditions. Usually it is also preferable to provide a jacket about the fermentor so that a cooling or heating medium may be circulated therethrough.

The B-1471 strain may be grown on many different media. In essence the medium should provide, besides water, (1) a source of energy, (2) a source of nitrogen, and (3) suitable minerals. The source of energy may be, for example, sucrose, dextrose, fructose, maltose, solubilized starch, dextrin, corn syrup, corn sugar, invert sugar, beet or cane molasses, syrups from fruit cannery wastes, cereal worts, and so forth. The source of nitrogen may be an organic or inorganic nitrogen derivative, as for example, proteins, hydrolyzed proteins, enzyme-digested proteins, amino acids, yeast extract, asparagin, urea, ammonia, ammonium hydroxide, ammonium phosphate, ammonium citrate, ammonium acetate, ammonium sulphate, ammonium nitrate, and so forth. Minerals required are potassium, sulphur, phosphorus, zinc, iron, manganese, magnesium, calcium, and cobalt. These agents are conveniently furnished in the medium in the form of soluble salts thereof. Generally the pH of the culture is maintained at about 5.5 to 7.5 and the temperature of the culture from about 35 to 40° C. It may be noted that it was not possible to demonstrate the existence of aterrimins in nature in natural substrates (soils) which contain the B-1471 strain of *B. subtilis*.

The whole culture prepared as above described can be used as a source of the aterrimins or various degrees of purification may be applied to the culture depending on the use to be made of the aterrimins. For example, for supplementing animal feeds the whole culture may be added to the feeds. Preferably, however, the culture is concentrated to a syrup or dehydrated to a solid state by application of evaporation at atmospheric pressure or under vacuum. By such means a more concentrated preparation of aterrimin is produced.

More highly active preparations of aterrimins can be produced by subjecting the culture of B-1471 to fractionation treatment. It has been found that when cultures of B-1471 are first acidified to a pH of 2 to 3.5 by addition of hydrochloric, sulphuric, phosphoric, or other acid, the precipitated material contains about 90% of the aterrimins, only about 10% remaining in the liquid phase. By centrifugation, the active precipitated material including the bacterial cells can be isolated from the relatively inactive supernatant. Thus the fractionation achieved by acidification of the culture and centrifugation results in a simple means of separating the active material from a gross quantity of the culture. The precipitated material may be dehydrated and thus is useful as a potent source of aterrimin for use, for example, in supplementing animal feeds. Alternatively, the bacterial cells may be removed by centrifuging the whole culture at neutral pH and the aterrimins may be recovered in more highly purified form by acidification of the supernatant liquor and centrifuging as described above.

The precipitate obtained by acidification and centrifugation of the B-1471 culture can be further fractionated to obtain the aterrimins in a relatively refined state so that this concentrate can be used in minute proportions to supplement feeds. To this end the precipitate referred to above is extracted with an alcohol, preferably an alcohol which is only partially soluble in water such as butanol, isobutyl alcohol, normal amyl alcohol, isoamyl alcohol, etc. The alcohol perferentially dissolves the active material and separates it from various impurities. To further remove impurities, the alcohol extract is treated with salt whereby insoluble impurities are precipitated and also an aqueous salt phase containing soluble impurities is formed. By separating the alcohol extract from the insoluble impurities and the aqueous salt solution a purified extract of aterrimins is obtained. Finally the purified aterrimin concentrate may be further refined by extraction or partition with various solvents such as acetone, ether, water, alcohols, chloroform, carbon tetrachloride, mixtures of the preceding, etc. to obtain the aterrimin concentrate in a highly purified and refined condition which is about 10,000 times purer than the solids of the original whole culture.

It has been observed that the cultures of *B. subtilis* B-1471 contain in addition to aterrimin activity another antibiotic factor which is inactive from the standpoint of stimulating animal growth. The fractionation treatment described hereinabove separates the aterrimins from the other antibiotic factor. The effect of the first part of the separation technique in making a gross separation of the two factors was demonstrated as follows: A culture of B-1471 was acidified to a pH of 2.5 by addition of hydrochloric acid. The acidified culture was then centrifuged to separate the precipitate and supernatant fractions. Ascending paper chromatography was then employed on these fractions using a solvent mixture containing 60% acetone, 2.5% acetic acid, and 37.5% water for the purpose of separating the two antibiotic factors produced by the organism. The chromatographs were developed bio-autographically against *B. megaterium* NRRL B-938 in beet molasses agar plates. The chromatographs showed two antibiotic factors to be present—the aterrimins with and $R_f$ value of 1 and the other factor with a value of 0. The chromatographs further indicated that the precipitate contained approx. 90% of the $R_{f1}$ (aterrimin) activity and only 10% of the $R_f 0$ activity; the supernatant contained approx. 90% of the $R_f 0$ activity and 10% of the $R_{f1}$ (aterrimin) activity. When the isolation treatment is carried out further through the salt-washed butanol extraction step, the $R_f 0$ activity is no longer detectable by the above chromatographic test.

Where the aim is to isolate the aterrimins A and B in pure form, the preliminary purification steps as outlined above are carried out. The resulting aterrimin concentrate is then subjected to chromatographic fractionation methods or countercurrent distribution, or both. For example, in the chromatographic method the aterrimin concentrate is applied to a silica gel column which is then eluted with a suitable solvent such as 6% alcohol in chloroform or mixtures of ethyl acetate and chloroform. The effluent from the column is collected in a series of portions which are then tested for the presence of aterrimin A or B by the use of ultraviolet spectrographic methods. In this way one can select the portions of the effluent which are rich in aterrimins A and B. The separate fractions may be again purified by the same chromatographic technique. Instead of or in addition to chromatography, countercurrent distribution in the Craig or similar apparatus is advantageous to obtain the pure compounds. For this purpose the aterrimin mixture is subjected to countercurrent distribution using for example the solvent systems described in Table 1. After carrying out a series of transfers, the tubes can be subjected to ultraviolet spectrographic methods to determine which tubes contain peak concentrations of aterrimins A and B. Procedures of chromatography and countercurrent distribution are demonstrated in Example V, below.

The following examples demonstrate the invention in greater detail. These examples are submitted by way of illustration and not limitation.

In the following examples aterrimin was assayed by a cup plate test against *Bacillus megaterium*. The activities of aterrimin preparations are expressed in units which are relative and based on a selective solution of partly purified aterrimin, the potency of which was arbitrarily designated as one unit per ml.

EXAMPLE I

A 2000 gal. culture of B-1471 was produced by the following technique:

The medium contained the following ingredients dissolved in sufficient water to make 2000 gallons:

| | | |
|---|---|---|
| Cane molasses | lbs | 1700 |
| $(NH_4)_2HPO_4$ | lbs | 68 |
| $(NH_4)_2SO_4$ | lbs | 17 |
| KCl | lbs | 13 |
| $ZnCl_2$ | g | 76 |
| $FeCl_3$ | g | 190 |
| $MgSO_4 \cdot 7H_2O$ | lbs | 8.4 |
| $MnSO_4 \cdot 4H_2O$ | lbs | 4.0 |

The sterilizer medium containing the above ingredients was contained in a fermentor equipped with an agitator, a sparger for introducing air into the culture, and a jacket for circulating cooling water about the fermentor. The medium was inoculated with 30 gal. of culture of B. subtilis B-1471 grown on a similar medium. The fermentation was conducted at 35° C. using constant agitation and forcing air into the culture at the rate of approximately 2000 gals. per minute. The pH of the culture was maintained in the range 6 to 7 by addition of ammonium hydroxide solution at intervals. Maximum cell yield was reached after about 10 hrs. After 12 hours the fermentation was stopped by shutting off the air supply and cooling the culture to room temperature.

EXAMPLE II (a) The culture as above described was acidified to pH 3 by addition of hydrochloric acid and the creamy precipitate was separated by centrifugation in a yeast separator.

(b) Forty gallons of the cream (equivalent of 200 gallons of culture), having an activity of 4.6 units/ml. was re-acidified to pH 2.5 with hydrochloric acid then re-centrifuged to yield 37.5 lbs. of a thick paste having an activity of 51 units/g. of paste.

(c) The thick paste was mixed with half its weight of a diatomaceous earth filter aid and extracted several times with a total of 100 liters of n-butyl alcohol. The butanol extract had an activity of 10.2 units/ml.

(d) The butanol extract was thoroughly mixed with 2500 ml. water, 12 lbs. salt, and sufficient sodium hydroxide to establish a pH of 5. The resulting purified butanol extract was separated from precipitated brown impurities, undissolved salt, and the aqueous phase containing salt and soluble impurities.

(e) The purified butanol extract was evaporated under vacuum to a syrupy consistency, washed with water to remove water-soluble impurities, then evaporated further to remove residual water. The 1370 ml. of aterrimin concentrate had an activity of 3900 units/g. of solids.

(f) A 500 ml. aliquot of the above concentrate was evaporated to dryness then dissolved in 1500 cc. of 1:1 chloroform-carbon tetrachloride solution which had been equilibrated with an equal volume of 75% aqueous methanol. This solution was extracted three times with 1500 ml. portions of previously equilibrated 75% aqueous methanol. The combined methanol extract had an activity of 9400 units/g. of solids.

(g) The methanol extract was then shaken with 1900 ml. water, 57 ml. saturated salt solution, and 950 ml. chloroform. The mixture was then allowed to settle and the lower (chloroform) layer was separated; this solution had an activity of 17,000 units/g. of solids.

(h) The chloroform solution was evaporated under vacuum to dryness and the residue dissolved in 75 ml. butanol. Petroleum ether (7500 ml.) was then added to the butanol solution and the resulting precipitate containing the active material was separated by filtration. This precipitate had an activity of 44,000 units/g. of solids.

(i) The above precipitate was then dissolved in 500 ml. acetone, the insoluble material filtered off, and the solution evaporated to dryness. This procedure was repeated again using 900 ml. ethyl ether. The final product had an activity of 76,000 units/g. of solids.

(j) The above product was then dissolved in 1:1 chloroform-carbon tetrachloride (which had been equilibrated with 75% methanol) and shaken with an equal volume of distilled water to give an oily interfacial precipitate which had an activity of 90,000 units/g. of solids.

(k) This preparation was then decolorized with carbon (Norit A) by stirring the sample dissolved in absolute ethyl alcohol with twice its weight of carbon at room temperature or by passing a solution of the preparation in absolute ethyl alcohol through a bed of carbon. After evaporation of the ethyl alcohol from the column effluent the dry product had an activity of 100,000 units/g.

(l) This product was then subjected to an 84 tube countercurrent extractor using the solvent system described in (f) to give in the peak tubes an aterrimin concentrate of about 220,000 units per g. of solids. This concentrate contained essentially only aterrimins A and B. The ultraviolet spectrum of this concentrate exhibited an absorption maximum at 277.5 millimicrons, a flat shoulder at 285 to 288 millimicrons, a faint shoulder at 262 to 272 millimicrons, and a minimum at 225 to 240 millimicrons.

EXAMPLE III

The purified product isolated through step (i) as described above was assayed against a series of organisms. The results are set forth below:

| Test organism | Concentration of product (i) of Example II giving complete inhibition in 20 hrs. incubation, p. p. m. |
|---|---|
| B. megaterium | 0.5 |
| M. flavus | 0.5 |
| M. pyogenes v. albus | 0.1 |
| Sarcina lutea | 0.1 |
| B. brevis BG | 2.0 |
| B. cereus | 0.5 |
| M. lysodekticus | 0.5 |

EXAMPLE IV

Several preparations produced by the procedures of Examples I and II were tested for their growth promoting activity. The first preparation was made by dehydrating under vacuum the whole culture produced as described in Example I. The second preparation was the moist centrifuge paste obtained in Example II, part (b). The third was the aterrimin concentrate obtained in Ex. II, part (e).

Feeding tests were carried out on the products described above employing the three preparations as supplements to a basal ration. For comparative purposes tests were also made of the non-supplemented ration. In each case the basal ration had the following composition:

| | | |
|---|---|---|
| Wheat bran | percent | 5 |
| Wheat middlings | do | 5 |
| Dehydrated alfalfa leaf meal | do | 5 |
| Soybean oil meal | do | 32 |
| Steamed bone meal | do | 2 |
| Ground yellow corn | do | 43.3 |
| Granite grit | do | 2 |
| Limestone grit | do | 2 |
| Iodized salt | do | 0.5 |
| Fish oil | do | 0.2 |
| $MnSO_4$ | do | 0.025 |
| Fish meal | do | 3 |
| Riboflavin | mg. per 100 g. ration | 0.15 |
| Choline | do | 100 |
| Cyanocobalamin (vitamin $B_{12}$) | micrograms per 100 g. ration | 3 |

The tests were conducted on groups of commercial hatchery-run New Hampshire chicks which were fed the basal ration and the ration supplemented as indicated for 4 weeks. The weights of the chicks and the efficiency of feed utilization are set forth below:

| Expt. | Feed supplement | Avg. weight of chicks expressed in grams or percentage of control | Feed required per gram of gain expressed in grams or percentage of control |
|---|---|---|---|
| 1 | No supplement (control), grams | 287 | 2.34 |
| 2 | Dried whole culture, 0.075%, percent | 104 | 97 |
| 3 | Dried whole culture, 0.25%, percent | 116 | 97 |
| 4 | Moist centrifuge paste from acidified culture (Ex. II. b), 0.038% (dry basis), percent | 106 | 100 |
| 5 | Moist centrifuge paste from acidified culture (Ex. II, b), 0.13% (dry basis), percent | 115 | 88 |
| 6 | No supplement (control), grams | 283 | 2.40 |
| 7 | Moist centrifuge paste from acidified culture (Ex. II, b), 0.13% (dry basis), percent | 119 | 84 |
| 8 | Moist centrifuge paste from acidified culture (Ex. II, b), 0.38% (dry basis), percent | 112 | 90 |
| 9 | Aterrimin concentrate (Ex. II, e), 0.005%, percent | 116 | 91 |
| 10 | Aterrimin concentrate (Ex. II, e), 0.016%, percent | 118 | 89 |

It is evident from the above data that the acidification and centrifugation treatment of the culture resulted in a concentration of the growth-stimulating activity and further, the butanol extraction procedure resulted in a further and marked increase in growth-stimulating activity.

EXAMPLE V (a) A culture as described in Example I was acidified to pH 3 by addition of hydrochloric acid and the creamy precipitate was separated by centrifugation in a yeast separator.

(b) Forty gallons of the cream (equivalent of 200 gallons of culture), having an activity of 6.6 units/ml., was re-acidified to pH 3.0 with hydrochloric acid then re-centrifuged in a super-centrifuge to yield 32 lbs. of a thick paste.

(c) The thick paste was mixed with half its weight of a diatomaceous earth filter aid and extracted in a column with n-butyl alcohol. Seventy-five liters of butanol extract were obtained having an activity of 14 units/ml.

(d) The butanol extract was evaporated under vacuum to a syrupy consistency, washed with water to remove water-soluble impurities, then evaporated further to remove residual water. The 2250 ml. of aterrimin concentrate had an activity of 4760 units/g. of solids.

(e) The above concentrate was evaporated to dryness in vacuum at room temperature then dissolved in 3000 ml. of 1:1 chloroform: carbon tetrachloride solution which had been equilibrated with an equal volume of 95% aqueous methanol. This solution was extracted five times with 3000, 2000, 2000, 1700, and 1500 ml. portions of previously equilibrated 75% aqueous methanol. The combined methanol extract had an activity of 7140 units/g. of solids.

(f) The combined methanol extract was then shaken with 4150 ml. water, 125 ml. saturated salt solution, and 2100 ml. chloroform. The mixture was then allowed to settle and the lower (chloroform) layer was separated; this solution had an activity of 17,250 units/g. of solids.

(g) The chloroform solution was evaporated under vacuum to dryness and the residue dissolved in 185 ml. butanol. Petroleum ether (18,000 ml.) was then added to the butanol solution and the resulting precipitate containing the active material was separated by filtration. This precipitate had an activity of 38,000 units/g. of solids.

(h) The above precipitate was then suspended in 1200 ml. acetone, the insoluble material filtered off, and the solution evaporated to dryness. This procedure was repeated again using 1800 ml. ethyl ether. The product had an activity of 79,400 units/g. of solids.

The material from step (h) which is highly colored may be separated into two major kinds of activity (aterrimins A and B) by chromatography on silica gel. An especially effective preparation for this separation is Mallinkrodt's silica gel designated as "Acid Silicic—Specially Prepared for Chromatographic Analysis by the Method of Ramsey and Patterson." By using this preparation in a 78 x 3.3 cm. column the product (h) can then be resolved into two well-separated peaks of activity when developed with either 6% alcohol in chloroform or with a mixture of ethyl acetate and chloroform in 2 to 1 ratio by volume.

(i) The product of step (h) was chromatographed in the dark or in yellow light in 400 mg. batches on 3.3 x 78 cm. columns of the above "Ramsey and Patterson" silica gel using as the developer a mixture of ethyl acetate (2 parts by volume) and chloroform (1 part by volume). The effluent from the column was collected in about 200 portions with a fraction collector. Bioassay of antibiotic activity and scanning of ultraviolet spectra in a recording spectrophotometer of the various portions of the effluent showed two well resolved peaks of activity and ultraviolet absorption corresponding to aterrimins A and B, the faster moving peak with the lower specific activity being aterrimin B, the second peak with about twice the specific activity being aterrimin A.

The portions of the column effluent in which aterrimin A was concentrated were combined as product i-A. In the same manner the portions of the effluent in which aterrimin B was concentrated were combined as product i-B.

[NOTE.—A minor portion (about 3%) of the activity but a significant portion (about 25%) of the solids of the applied load was not eluted from the column with the ethyl acetate-chloroform developer. This material could however be eluted with 50% alcohol in chloroform. This difficultly eluatable material was not further characterized beyond assay for activity and absorbance balances which were satisfactory, that is, the sum of the activity of this material together with the activites of the eluted aterrimins A and B essentially equaled the total activity initially put on the column.]

*Isolation of aterrimin A.*—Product i-A was evaporated to dryness and rechromatographed on a 78 x 3.3 cm. column of the "Ramsey and Patterson" silica gel using as the developer 6% alcohol in chloroform. The portion of the effluent rich in aterrimin A was then subjected to countercurrent distribution in the Craig apparatus using the solvent systems F and H of Table 1. The countercurrent distribution curve (plot of concentration vs. transfer number) showed the presence of only one kind of activity as indicated by good fit between the experimental curve of biological activity and the binomial (theoretical) distribution. After removal of small amounts of slowly moving, biologically-inactive impurities in system F and removal of fast-moving impurities in system H, the resulting sample gave good fits between the experimental curves of both biological activity and ultraviolet absorption and the binomial distribution in both system F (55 transfers) and system H (180 transfers). The purified product (aterrimin A) had a specific activity of about 550,000 units/g. which represents about a 600,000-fold purification over the original culture. The product was subjected to various tests for characterization which are reported hereinabove.

*Isolation of aterrimin B.*—Product i-B was evaporated to dryness and rechromatographed on a 78 x 3.3 cm. column of the "Ramsey and Patterson" silica gel using as the developer 6% alcohol in chloroform. The portion of the effluent rich in atterrimin B was then subjected to countercurrent distribution in the Craig apparatus. Minor impurities were removed by distribution in the solvent systems F and H of Table 1. The product (aterrimin B) showed good approximations to theoretical behavior in solvent systems O (92 transfers) and G (66 transfers). Systems O and G are given in Table 1. The product had a specific activity of about 240,000 units/g. which represents about a 400,000-fold purification over the original culture. The product was subjected to various tests for characterization, the results are reported hereinabove.

It is to be noted that the countercurrent distribution serves the dual function of purification and provision of evidence of homogeneity. The fact that the samples of aterrimins A and B showed good approximation with the theoretical behavior in two different solvent systems is equal or better evidence of homogeneity than the property of crystallinity and possession of a melting point which factors are commonly used as indicators for purity of organic compounds.

*Alternative methods.*—Aterrimins A and B may be isolated directly from the ether soluble product of step (h) by countercurrent distribution in the solvent systems of Table 1, thus eliminating the use of silica gel chromatography. The separating power (B value) of the systems F, G, and H is more than adequate to easily separate aterrimin A from aterrimin B. However, the silica gel chromatography does remove emulsifiers which are extremely troublesome in countercurrent distribution.

The name aterrimin refers to a family of closely related antibiotic substances produced by *B. subtilis* var. *aterrimus* NRRL–B–1471. Aterrimins A and B which are responsible for the bulk of the in vitro antibiotic activity of the culture have been isolated and characterized. In addition at least 5 other antibiotically active substances have been recognized and partially purified during fractionation of the culture. These are:

(1) The fraction separated by acid precipitation as described hereinabove. This fraction is inactive from the standpoint of stimulating animal growth and has a $R_f$ value of 0 in the chromatographic method described above.

(2 and 3) The fraction from Example V, part (h) which is insoluble in ethyl ether. This fraction was further fractionated by chromatography on silica gel, developed with 4%, 6%, and 50% alcohol in chloroform, into two kinds of activity. Very high recovery of antibiotic activity (200%) indicated interaction of the components of the mixture in the cylinder plate assay.

(4) There is an active fraction in the ether soluble material of Example V, part (h) which is not eluted from silica gel columns by 6% alcohol in chloroform. This activity may or may not be multiple.

(5) A small amount of a fraction with a high ($K=$ about 5) partition coefficient in systems F and G (Table 1) which is eluted close to aterrimin from silica gel columns loaded with the ether soluble fraction of Example V, part (h).

None of these five fractions have been isolated in pure form. The ultraviolet spectra of 2, 3, 4, 5 in the partly purified form are all similar to those of aterrimins A and B.

Having thus described the invention, we claim:

1. An organic compound selected from the group consisting of: (1) atterimin A, soluble in methyl, ethyl, propyl, isopropyl, and butyl alcohols, but relatively insoluble in carbon tetrachloride, saturated hydrocarbons, and other relatively non-polar solvents, soluble in water at alkaline pH's but relatively insoluble at neutral and acid pH's, exhibiting the characteristics of a lactone, containing only the elements carbon, hydrogen, and oxygen in the amounts, carbon, 65.5%, hydrogen, 7.8%, oxygen, 26.7% (by difference), having a specific rotation in absolute ethanol of plus 245°, the ultraviolet absorption spectrum of which in absolute alcohol exhibits, expressed in millimicrons, maxima at 277 and 287, a broad maximum at 310–325, a shoulder at 267, and a broad minimum at 225–240, the infrared spectrum of which in potassium bromide pellets exhibits absorption bands, expressed in microns, at 2.94, 3.43, 5.69, 5.81, 6.19, 6.48, 6.88, 7.27, 7.49, 7.63, 8.54, 9.18, 9.42, 9.59, 9.75, 10.04, 12.46, 12.86, and 13.30; (2) the salts of said aterrimin A with alkaline substances; (3) the free hydroxy-acid form of said aterrimin A producted by acidifying said salt; (4) aterrimin B, soluble in methyl, ethyl, propyl, isopropyl, and butyl alcohols, but relatively insoluble in carbon tetrachloride, saturated hydrocarbons, and other relatively non-polar solvents, soluble in water at alkaline pH's but relatively insoluble at neutral and acid pH's, exhibiting the characteristics of a lactone, containing only the elements carbon, hydrogen, and oxygen in the amounts, carbon, 69.7%, hydrogen, 8.05%, oxygen, 22.25% (by difference), having a specific rotation in absolute ethanol of plus 342°, the ultraviolet absorption spectrum of which in absolute alcohol exhibits, expressed in millimicrons, maxima at 277, 287, a broad maximum at 310–325, a shoulder at 267, and a broad minimum at 230, the infrared spectrum of which in potassium bromide pellets exhibits absorption bands, expressed in microns, at 2.94, 3.43, 5.68, 5.84, 6.20, 6.50, 6.88, 7.28, 7.48, 8.48, 9.14, 9.41, 9.74, 10.09, 10.83, 11.19, 11.68, 12.47, 12.85, and 13.29; (5) the salts of said aterrimin B with alkaline substances; and (6) the free hydroxy-acid form of said aterrimin B produced by acidifying said salt.

2. Aterrimin A as described in claim 1.

3. Aterrimin B as described in claim 1.

4. A process for enriching the aterrimin content of a culture of *Bacillus subtilis* var. *aterrimus* NRRL B–1471 which comprises acidifying a culture of *B. subtilis* var. *aterrimus* NRRL B–1471, separating the precipitate from the supernatant liquid, and extracting the precipitate with an alcohol to obtain an extract rich in aterrimins.

5. The process of claim 4 wherein the alcohol is butanol.

6. A process for isolating aterrimins which comprises acidifying a culture of *B. subtilis* var. *aterrimus* NRRL B–1471, separating the precipitate, extracting the precipitate with butanol, evaporating the butanol extract, washing the evaporated extract with water to remove water-soluble impurities, partitioning the resulting product in a system of chloroform, carbon tetrachloride and aqueous methanol, separating the aqueous methanol solution containing active material, admixing the aqueous methanol solution with saturated salt solution and chloroform, separating the chloroform solution containing active material, evaporating the chloroform solution, dissolving the residual material in butanol, precipitating the active material from the resulting butanol solution by addition of petroleum ether, dissolving the precipitate in acetone, separating insoluble impurities, evaporating the solution, taking up the residue in ether, removing insoluble impurities, and reducing the ether solution to dryness.

7. The process of claim 6 wherein the product obtained by reducing the ether solution to dryness is separated into its components, aterrimin A and aterrimin B, these substances being as described in claim 1, by subjecting the dry material to countercurrent distribution with a solvent system containing carbon tetrachloride, a water-soluble alkanol, and water.

8. A process for separating aterrimins A and B, these substances being as described in claim 1, from a mixture of the same which comprises subjecting the mixture to countercurrent distribution with a solvent system containing carbon tetrachloride, a water-soluble alkanol, and water.

9. A composition of matter produced by culture of *B. subtilis* var. *aterrimus* consisting essentially of a mixture of aterrimins A and B as described in claim 1.

References Cited in the file of this patent

UNITED STATES PATENTS 2,653,899  Bunch _____ Apr. 14, 1952

(Other references on following page)

FOREIGN PATENTS 496,632    Canada _____ Oct. 6, 1953

OTHER REFERENCES

Karel: "A Dictionary of Antibiosis," 1951, p. 43.

Lewis et al.: J. Agri. and Food Chem., 1953, pp. 1159–1163.

Applied Microbiology, July 1954, pp. 174–175.

Craig et al.: 1947, J. Biol. Chem., vol. 168, pp. 665–668.

Kies et al.: J. Biol. Chem., April 1951, pp. 637–650.

Baron: Handbook of Antibiotics, pp. 118–120, pub. 1950 by Rheinhold Publ. Co., N. Y. C.

Burton et al.: The Biochem. J., December 1951, pp. 168–174.

Burton et al.: The Biochem. J., January 1956, pp. 171–176.

Karel: "Dictionary of Antibiosis," pp. 226, 248, 272 and 273; pub. by Univ. Press, N. Y. C., 1951.

Waksman et al.: "The Actinomycetes and Their Antibiotics," pp. 171–172. Pub. 1953 by Williams and Wilkins, Baltimore, Md.

Biological Abstracts, November 1954, p. 2638.